United States Patent [19]
Burke

[11] Patent Number: 4,796,339
[45] Date of Patent: Jan. 10, 1989

[54] ONE-WAY SNAP FASTENER

[75] Inventor: James E. Burke, Huntington, Conn.

[73] Assignee: Scovill Fasteners Inc., New York, N.Y.

[21] Appl. No.: 156,667

[22] Filed: Feb. 17, 1988

[51] Int. Cl.$^4$ .............................................. A44B 1/38
[52] U.S. Cl. ........................................ 24/662; 24/297
[58] Field of Search .............. 24/662, 580, 584, 573, 24/598, 625, 90.5, 90 E, 297; 411/508, 510

[56] References Cited

U.S. PATENT DOCUMENTS

| | | | |
|---|---|---|---|
| 1,248,723 | 12/1917 | Roth | 24/625 |
| 2,937,834 | 5/1960 | Orenick et al. | 24/573 |
| 3,210,820 | 10/1965 | Humiston | 24/584 |
| 3,210,883 | 10/1965 | Ulsh | 24/662 |
| 3,416,200 | 12/1968 | Daddona, Jr. | 24/662 |
| 4,373,826 | 2/1983 | Inamoto et al. | 24/297 |
| 4,606,097 | 8/1986 | Lam et al. | 24/90 E |
| 4,629,356 | 12/1986 | Hayashi | 24/297 |

Primary Examiner—Victor N. Sakran
Attorney, Agent, or Firm—Dallett Hoopes

[57] ABSTRACT

Molded one-way snap fastener comprises a stud head having a base flange and radial fins extending up from its center to a circular top. The top has downward barbs spaced between the fins. The socket has a base flange and a sleeve having a tapered mouth with a throat and an annular downwardly and outwardly inclined bearing surface above the throat and a cylindrical opening thereabove. The dimensions of the parts are such that once the stud head is inserted into the socket and the barbs pass the throat, they spring out and contact the side walls of the cylindrical opening, immobilizing the stud head in the socket. After that, attempts to unsnap the socket result in the butting of the ends of the barbs into the bearing surface, which because of its downward and outward slope, spreads the barbs causing them more resolutely to defy unsnapping. The fastener must be destroyed to give up its snapped state.

5 Claims, 1 Drawing Sheet

ONE-WAY SNAP FASTENER

BACKGROUND OF THE INVENTION

1. Field of the Invention

This invention relates to a one-way snap fastener, that is, a snap fastener which can be snapped closed but cannot be unsnapped without destroying it. Such fasteners are used, for instance, in attaching plastic strap bracelets to patients in a hospital. The purpose of such a bracelet is to identify the patient in a way which is reliable and cannot be defeated by its inadvertent or willful removal.

More specifically, this invention relates to a one-way snap fastener in which the head presents a plurality of barbs which spring out after they snap together and then tend to spring out further and lock even tighter upon attempts to unsnap the fastener.

2. Description of the Prior Art

The prior art is of course replete with snap fasteners of different descriptions. There are, however, examples of permanently locking fasteners or one-way fasteners pertinent to the present invention. For instance, U.S. Pat. 3,416,200, which issued Dec. 17, 1968 to Daddona, discloses a fastener wherein the stud has a solid head and the socket has an upwardly inclined annular strut which catches under the head after the snap installation. There is ample room in the socket opening to permit tilting of the head.

In U.S. Pat. No. 3,210,820, which issued Oct. 12, 1965 to J. H. Humiston, the head is split and squeezes together as it passes the neck of the socket.

SUMMARY OF THE PRESENT INVENTION

In the present invention the stud head has a solid top from the periphery of which downward barbs extend. The throat of the socket is substantially the same diameter as the barb top of the stud, and the opening of the socket beyond the throat is the same diameter as the outer diameter of the barbs to prevent lateral motion or "play" in the snapped-together assembly. Above the throat the socket is formed with a downwardly and outwardly slanting annular-bearing surface.

BRIEF DESCRIPTION OF THE DRAWINGS

Other objects and features of the invention will be apparent from the following specification and reference to the drawings, all of which disclose a non-limiting form of the invention. In the drawings.

DESCRIPTION OF THE PREFERRED EMBODIMENT

Figure 1:
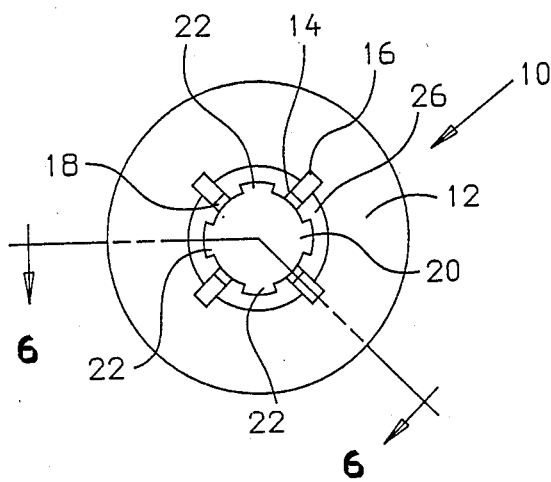
FIG. 1 is a top plan view of a stud head embodying the invention.

A stud head embodying the invention is generally designated 10 in FIG. 1. It, like the socket, is molded from a synthetic plastic such as Acetel.

Figure 2:
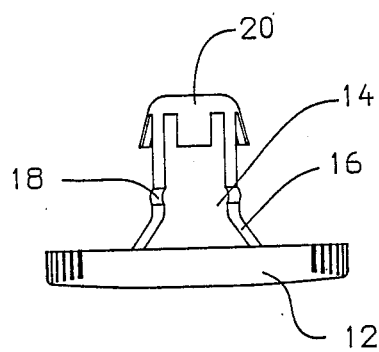
FIG. 2 is a side elevational view of the stud head.

The stud head comprises a circular base flange 12 from the center of which extend upwardly a plurality of radial fins 14. The fins all extend into the center of the flange and are molded integrally. Where they join the base flange 12, the flanges are formed with a radially outward chamfer 16 (FIG. 2), and above the chamfer each of the fins is formed with an outward nub 18.

At the top of the fins is integrally molded a solid cylindrical head 20. As shown in FIG. 1, the head 20 is formed in between the fins 14 with downward barbs 22. Barbs 22 extend freely and straight downward, thinning as their lower ends are approached and they terminate in a distal end 24. As shown (FIG. 1), the barbs 22 and the fins 14 alternate around the circumference of the top, the fins in the area of the barbs 22 being of lesser diameter than the barbs so that the barbs control the force required to effect the "on" action. Purposely the fins are not aligned radially with the barbs so that they do not stiffen or otherwise affect action of the barbs 22.

Figure 5:
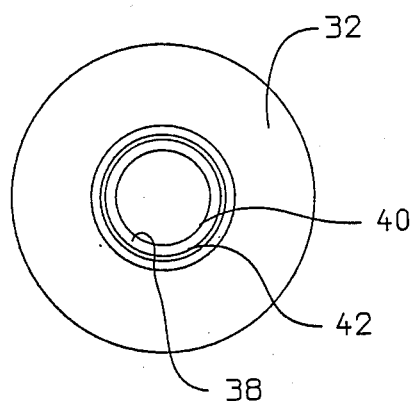
FIG. 5 is a bottom plan view of the socket.
Figure 3:
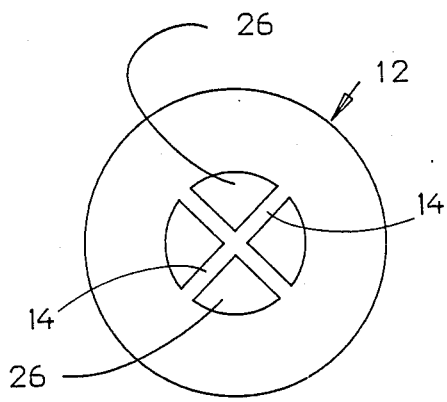
FIG. 3 is a bottom plan view of the stud head.

Between the fins 14 (FIG. 3) the base flange 12 is formed with four quarter-circle openings 26. These are openings left by the core pin in the molding of the fastener. As will be noted from FIG. 5, ample space is provided as at 28 between the barb 22 and the fins 14.

Figure 4:
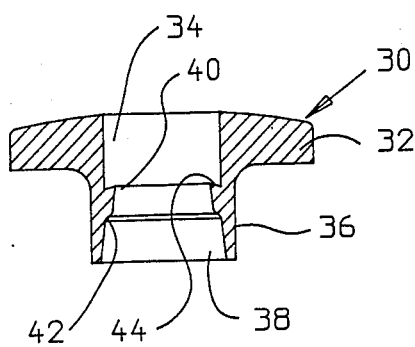
FIG. 4 is a sectional view of a socket embodying the invention.

Turning now to the socket, as shown best in FIG. 4, it is generally designated 30 and comprises an annular base flange 32 having a cylindrical opening 34 centrally disposed. A sleeve 36 extends downward from the flange 32 and is integral with the flange about the opening 34, and the sleeve presents a mouth 38 which is tapered inwardly to a throat 40 inside the sleeve. A shoulder 42 is formed in the tapered mouth 38 for purposes which will appear. Above the throat 40 the socket is formed with a downwardly and outwardly slanting annular-bearing surface 44. Preferably, this surface is at an angle of about 15° down from the horizontal.

Figure 6:
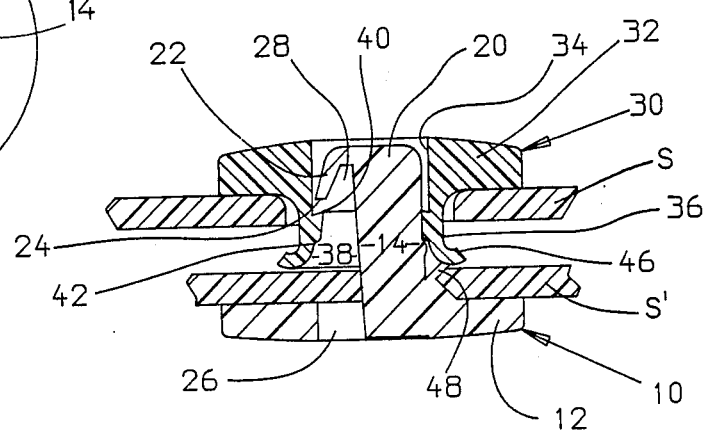
FIG. 6 is an enlarged sectional view on line 6—6 of FIG. 1 but of the assembly showing the stud head assembled into the socket and showing both stud head and socket installed or "set" on plastic strap material, as is the case with a braclet.

FIG. 6 shows in use a snap fastener embodying the invention. It comprises the socket 30 and the stud head 10 installed on plastic stripping S and S' respectively, which may be of plastic and having a thickness in a range of 0.01–0.03 inches.

In the setting operation the end of the mouth of the socket is curled over as at 46 to hold the strap S between it and the flange 32 so that the strap does not escape. The opening in the strap S is of smaller diameter than the curled-over edge 46.

The stud head strap S' is also apertured, but with a smaller aperture, prior to the setting operation. In the setting operation a circular skiving tool comes down and from the chamfer of each fin 14 turns outward a curl 48 of plastic to clamp the strap S' between the curl 48 and the flange 12 so that there is no chance that prior to assembly the strap S' will separate from the stud head.

In installation the end 20 of the stud head is introduced to the mouth 38 of the socket and is pushed upwardly past the shoulder 42 and through the throat 40, the barbs 22 flexing inwardly as necessary. Above the throat 40 the barbs 22 spring outwardly, as shown in FIG. 6, and engage or substantially engage the sides of the opening 34 with which they have a common diameter. The nubs 18 nestle under and against the shoulder 42 and serve as stop means precluding the further movement of the stud head into the socket. In this position the outer edges of the fins 14 engage the throat 40 snugly, the resilience of the parts assuring lateral immobility of the stud relaive to the socket.

Attempts to withdraw the stud head from the socket result in the butting of the ends 24 of the barbs 22 against the bearing surface 44. Because the bearing surface 44 slopes outwardly and downwardly, there is a tendency for the barbs to spread even farther and reduce even more the likelihood that the parts can be unsnapped. What will happen is that the distal ends 24 will nestle into the crotch between the cylindrical opening 34 and the bearing surface 44 and stay stubbornly there.

Dimensions of the socket and head are such that the top 20 of the head is at a level slightly below the top surface of the socket flange 32. This assures that the head will not protrude from the back of the socket flange and will not create an undesirable projection.

It should be understood that while the invention is shown in but one form, there may be many modifications and variations. The invention, therefore, is of more general scope and may be defined by the following claim language.

I claim:

1. A permanently locking snap fastener comprising:
   a. an integrally molded stud head comprising a circular base flange having a plurality of radially disposed thin fins extending up from about the axis of the circular base, the fins having on their upper end a generally circular dome, the dome having from its periphery alternating with the fins a plurality of spaced outwardly and downwardly extending straight barbs, the barbs having flat lower ends; and
   b. a socket comprising an annular base flange having a downward-extending sleeve, the sleeve having an upward tapered lead-in opening narrowing as its upper end is approached and above that an outwardly and downwardly inclined annular-bearing surface, the socket also being formed with a cylindrical opening extending from the base flange down to the outer diameter of the bearing surface, the cylindrical opening having approximately the same diameter as the distal ends of the barbs, the junction of the tapered lead-in and the inclined-bearing surface defining a throat having a radius substantially the same as the width of the fins on the stud head, the head and socket being of such relative dimensions that when the head is installed into and through the lead-in opening in the sleeve the barbs will flex inward as they pass the throat and then snap outward so that any subsequent attempt to open the fastener will cause the barbs to butt against the bearing surface and prevent opening.

2. A permanently locking snap fastener as claimed in claim 1 wherein the fins of the stud are formed with outward projections intermediate their upper and lower ends and the tapered lead-in of the socket has an annular inward deflection intermediate its ends and in installation the projections engage the deflection to serve as stop means.

3. A permanently locking snap fastener as claimed in claim 2 wherein the barbs taper in width, narrowing as their distal ends are approached.

4. A permanently locking snap fastener as claimed in claim 1 wherein the bearing surface angles downward and outward from the center at an angle of about 15° from horizontal.

5. A permanently locking snap fastener as claimed in claim 1 wherein the greatest outside diameter of the stud head measured across the distal ends of the barbs is substantially the same as the diameter of the cylindrical opening in the socket.

* * * * *